United States Patent [19]

Schiebel et al.

[11] Patent Number: 4,953,038
[45] Date of Patent: Aug. 28, 1990

[54] SYSTEM INCLUDING A CCD IMAGER DEVICE FOR READING A STORAGE PHOSPHOR RECORD CARRIER

[75] Inventors: Ulrich Schiebel; Walter Hillen, both of Aachen, Fed. Rep. of Germany

[73] Assignee: U.S. Philips Corporation, New York, N.Y.

[21] Appl. No.: 236,575

[22] Filed: Aug. 25, 1988

[30] Foreign Application Priority Data

Aug. 28, 1987 [DE] Fed. Rep. of Germany ....... 3728750

[51] Int. Cl.$^5$ .............................................. H04M 1/024
[52] U.S. Cl. ..................................... 358/471; 358/483; 358/496; 358/477; 250/327.2 R; 250/484.1; 250/327.2
[58] Field of Search ............... 358/471, 474, 482, 483, 358/494, 496; 250/327.2 R, 327.2 A, 327.2 B, 327.2 C, 327.2 D, 327.2 E, 327.2 F, 327.2 G, 327.2 H, 327.2 J, 327.2 K, 327.2 L, 484.1 R, 484.1 A, 484.1 B, 484.1 C

[56] References Cited

U.S. PATENT DOCUMENTS

| | | | |
|---|---|---|---|
| 4,369,367 | 1/1983 | Horikawa | 250/327.2 F |
| 4,628,356 | 12/1986 | Spillman et al. | 378/146 |
| 4,814,616 | 3/1989 | Saotome | 250/484.1 B |
| 4,816,679 | 3/1989 | Sunagawa et al. | 250/327.2 E |
| 4,818,880 | 4/1989 | Matsuda et al. | 250/327.2 D |
| 4,851,677 | 7/1989 | Hosoi et al. | 250/327.2 C |

FOREIGN PATENT DOCUMENTS

| | | |
|---|---|---|
| 0123942 | 7/1988 | European Pat. Off. . |
| 0167747 | 8/1988 | European Pat. Off. . |
| 58-103267 | 6/1983 | Japan ................................... 358/483 |

OTHER PUBLICATIONS

Paul G. Jespers et al., editors, *Solid State Imaging*, Noordhoff–Leyden, 1976, pp. 659–671, "Time Delay and Integration Image Sensors", D. F. Barbe.

*Primary Examiner*—Edward L. Coles, Sr.
*Attorney, Agent, or Firm*—William Squire

[57] ABSTRACT

A photodetector CCD pick-up device reads a storage phosphor record carrier via a light source on one side of the carrier with the photodetector device on the other side of the carrier. A drive displaces the carrier relative to the light source and to the CCD device. The light source illuminates the phosphor sub-surface of the record carrier to produce fluorescent light and which sub-surface comprises a plurality of pixels. The CCD pick-up device is arranged so that the charges in its cells produced by the fluorescent light displace in the same direction and at the same speed as the carrier.

9 Claims, 2 Drawing Sheets

SYSTEM INCLUDING A CCD IMAGER DEVICE FOR READING A STORAGE PHOSPHOR RECORD CARRIER

The invention relates to a device for reading a storage-phosphor record carrier, comprising a light source which is arranged at one side of the record carrier for optical stimulation of the storage phosphor, a photodetector device which is arranged at the other side of the record carrier for conversion into an electric signal of fluorescent light generated by stimulation of the phosphor, and a drive device for realizing a relative displacement between the record carrier on the one side and the light source and the photodetector device on the other side.

A device of this kind is known from EP-OS 01 67 747. The light source thereof is formed by a row of, for example light-emitting diodes, the detector device consisting of correspondingly arranged photodiodes. The light-emitting diodes are successively switched on, so that the photodiodes successively convert the fluorescent light, formed one point after the other, into an electric signal. In order to cover the entire record carrier, the light source and the photodetector device are displaced relative to the record carrier, i.e. first in a first direction perpendicular to the row direction, and subsequently in a second direction which is perpendicular thereto. Because reading is sequential, the read times are comparatively long.

The same holds good for devices which are known from EP-OS 123 942 in which the light is delivered by a laser whose beam is directed onto the record carrier via a deflectable mirror, the fluorescent light being applied to a photodetector via an optical fibre system. Again comparatively long periods of time are required for the reading of the image, not only because of the sequential scanning but also because of the limited laser power. For the helium neon lasers which are customarily used for such applications and which have a laser power of approximately 30 mW, the read time amounts to 1 minute; for a read time of 10 seconds, approximately 200 mW would be required for the same signal-to-noise ratio, this power can hardly be realized for such lasers.

It is an object of the invention to construct a device of the kind set forth so that the time required for reading the storage phosphor record carrier is substantially reduced. This object is achieved in accordance with the invention in that the light source illuminates a sub-surface which consists of a plurality of pixels, the photodetector device comprising a CCD image pick-up device which covers the illuminated sub-surface and which is arranged and controlled so that the charges in the cells of the CCD image pick-up device are transported in the same direction and at the same speed as the sub-surface illuminated by the light source is displaced on the record carrier.

Contrary to the known methods where the pixels are sequentially illuminated and read, in accordance with the invention the illumination and reading of the pixels of the sub-surface is performed simultaneously. Because of the relative displacement between the record carrier and the light source as well as the photodetector device, the illuminated and read sub-surface moves across the record carrier. In order to achieve a sufficiently high signal-to-noise ratio, charges in the cells of the CCD image pick-up device, converting the fluorescent image produced by stimulation into an electric signal, are transported in the indicated manner so that the image information originating from a pixel during its stimulation is integrated.

The signal-to-noise ratio, being limited by the given sensitivity of the CCD image pick-up device, can be further improved in a further embodiment of the invention in that the detector device comprises an image intensifier which is arranged between the record carrier and the CCD image pick-up device and which images the fluorescent image produced on the storage phosphor record carrier onto the CCD image pick-up device. The image intensifier thus increases the luminescent density of the fluorescent image before it is converted into an electric signal by the image pick-up device.

It is particularly attractive when the relative displacement between the record carrier on the one side and the light source and the photodetector device on the other side need take place in only one direction. However, this implies that the photodetector device must cover the fluorescent image across the entire width (or length) of the record carrier. In practice, however, the dimensions of a record carrier amount to approximately 40 cm. CCD image pick-up devices of such dimensions, however, cannot yet be manufactured at present. In order to enable a wider area of the fluorescent image, to be covered as yet in a further version of the invention, the CCD image pick-up device comprises a plurality of CCD image pick-up devices which are adjacent arranged perpendicularly to the displacement direction.

In a further version of the invention, the light source is formed by a low-pressure sodium discharge lamp. Low-pressure sodium discharge lamps have a very high radiation density, notably in the wavelength range which is of essential importance for the stimulation of storage phosphors.

The invention will be described in detail hereinafter with reference to the drawings. Therein:

FIG. 1 diagrammatically illustrates an embodiment of the invention,

Figure 1:
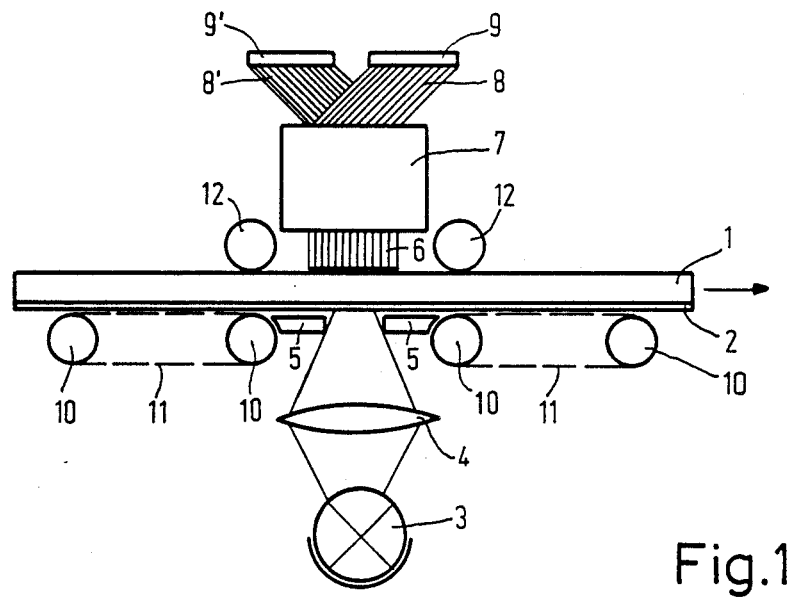

The storage phosphor record carrier whose principal dimension extends perpendicularly to the plane of drawing of FIG. 1 consists of a transparent substrate 2 on which there is provided a layer of storage phosphor 1, for example as described in U.S.-PS 4 369 367. The record carrier 1, 2 is situated in a read station in which it is transported, preferably at a constant speed, in the direction of the arrow by means of transport rollers 10, 13 and conveyor belts 11. At the side of the record carrier where the transparent substrate is situated there is arranged a tubular light source 3 which illuminates a sub-surface area of the record carrier 1, 2 via a cylindrical lens 4 and through the aperture of a diaphram 5, thus stimulating the storage phosphor present thereon. The principal dimension of the light source 3, the cylindrical lens 4 and the diaphram 5 extends perpendicularly to the plane of drawing, preferably across the entire width of the record carrier 1, 2. The light source is preferably formed by a low-pressure sodium discharge lamp whose light is in the optimum wavelength range for the stimulation of the storage phosphor. As a result, a plurality of adjacent pixels are illuminated simultaneously in a two-dimensional array from right to left in the drawing and into the plane of the drawing.

The fluorescent image produced by stimulation is imaged onto the photocathode of an image intensifier 7 by means of an optical fibre plate 6, for this purpose the photocathode is preferably provided directly on the optical fibre plate. In the beam path preceding the image intensifier there is arranged a filter (not shown) which suppresses all radiation whose wavelength does not correspond to the wavelength of the fluorescent light. Thus the light originating from the light source 3 cannot reach the entrance of the image intensifier 7.

The exit image of the image intensifier 8 is transferred to the input of a CCD image pick-up device by means of an optical fibre system. Because a CCD image pick-up device represents an integrated circuit having comparatively small dimensions, in the direction perpendicular to the plane of drawing there are provided a number of optical fibre segments 8, 8', each of which comprises a CCD image pick-up element 9, 9'. The neighbouring segments 8, 8' are preferably inclined towards one another, so that the CCD image pick-up elements 9, 9' whose optically active surfaces are always smaller than their dimensions cannot contact one another, at their ends which are remote from the image intensifier 7.

Figure 2:
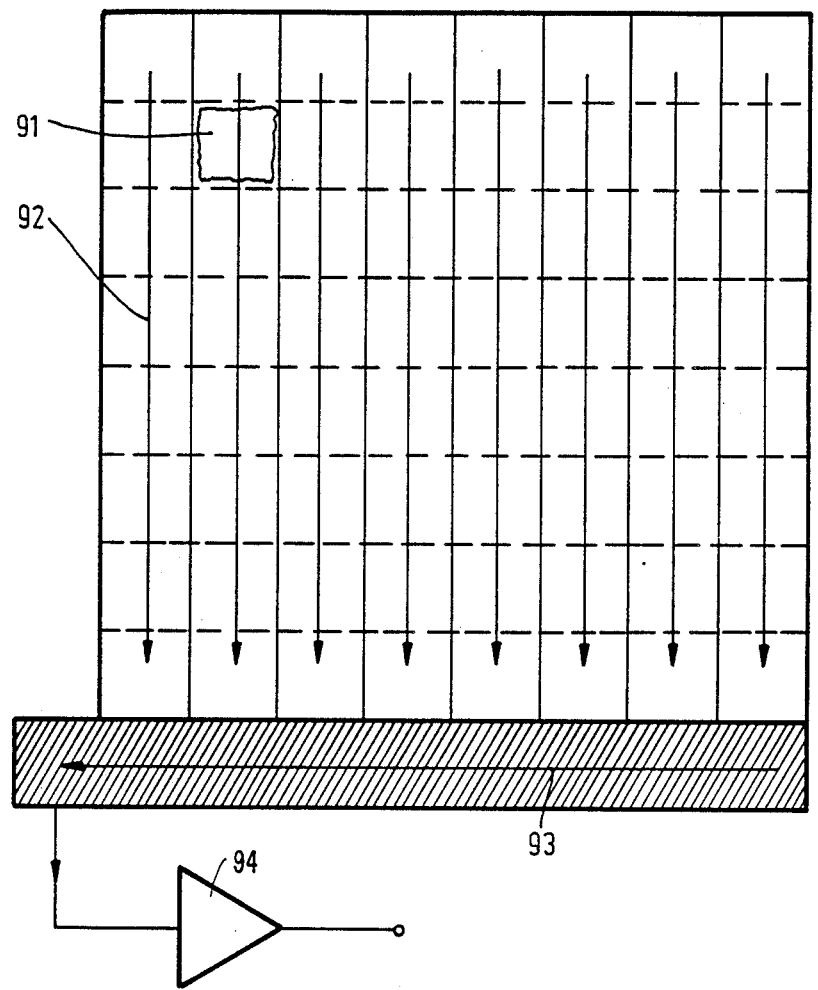
FIG. 2 shows a CCD image pick-up device and a charge transport therein.

FIG. 2 diagrammatically shows an image pick-up element. It consists of a plurality of transfer channels 92, each of which consists of a number of photosensitive charge-coupled cells. These CCD image pick-up elements are mounted on the fibre optical segments 8, 8' so that the direction of their channels 92 coincides with the displacement direction of the storage phosphor record carrier 1, 2. The read rate for the CCD image pick-up elementsis chosen so that the charge is transferred through the transfer channel from one cell to another at the same speed as that at which the image of a pixel on the storage phosphor record carrier 1, 2 is displaced due to the displacement of the record carrier. As a result of this known method (see. G. G. Jespers et al. "Solid State Imaging", Noordhoff-Leyden, 1976, pp. 659–671), it is achieved that the charge present in a cell of the CCD image pick-up element at a given instant is influenced only by the fluorescent light which originates from a given point on the record carrier, even though the image of this point moves across the CCD image pick-up elements.

The exits of the channels 92 are coupled to a respective cell of a register 93, which is not illuminated as indicated by the shading, and which can be serially read. The clock frequency for this register must be larger, by at least a factor corresponding to the number of columns of a CCD image pick-up element, than the clock signal which displaces the charge within the individual channels. The data stream thus produced on the output of the analog register 93 is amplified in an amplifier 94, after which it is applied to an analog-to-digital converter.

Figure 3:
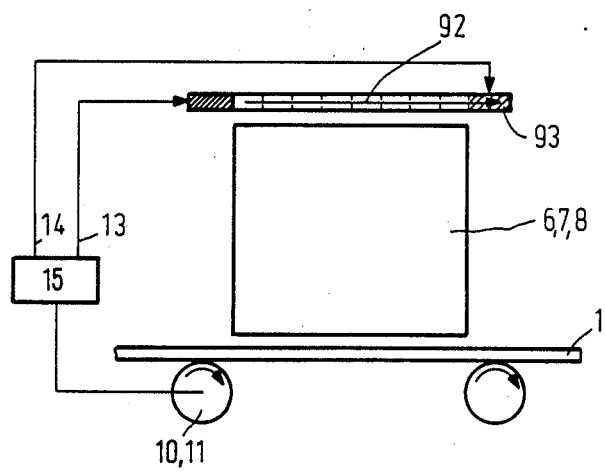
FIG. 3 shows a part of a CCD device for such an image device claimed in claim 1.

As appears from the foregoing, the speed of displacement of the record carrier 1, 2 and that of the charges in a transfer channel 92 must be identical. FIG. 3 diagrammatically shows how this can be realized. The transport rollers 10, 12 whose circumference amounts to, for example 90 mm, comprise an incremental tacho generator which outputs a fixed number of pulses to a digital electronic circuit 15 during each revolution, for example 18,000 pulses. The circuit 15 produces the clock pulses for the charge displacement in the channels 92 by suitable division of the tacho generator pulses on the output 13. The number of clock pulses depends on the size of an image element, i.e. a cell of the CCD image pick-up element 9. When the cell has a length of 0.1 mm, 900 clock pulses will be required per revolution of the drive roller; this number of clock pulses is obtained by dividing the tacho generator pulses by a factor 20. Moreover, on its output 14 the circuit 15 produces (at least) as many clock pulses as there are channels 92. In the case of 100 channels, therefore, one hundred clock pulses will be required on the output 14 between two clock pulses on the output 13.

When the storage phosphor record carrier 1, 2 is displaced at a speed of 200 mm per second, the number of revolutions of the transport roller 10 and hence of the transport belt 11, must amount to 2.22 revolutions per second. The pulse frequency on the output 13 then amounts to 2 KHz, resulting in a value of between 200 and 250 KHz for the pulse frequency on the output 14.

What is claimed is:

1. An imaging device for reading a storage phosphor record carrier having opposing sides, said device comprising a light source which is arranged at one side of the record carrier for optical stimulation of the storage phosphor, a photodetector device which is arranged at the other opposing side of the record carrier for conversion into an electric signal of fluorescent light generated by stimulation of the phosphor, and a drive device for realizing a relative displacement between the record carrier and (1) the light source on one side of the carrier and (2) the photodetector device on the other side of the carrier, said device comprising a light source which illuminates a sub-surface area of the carrier which sub-surface area comprises a plurality of adjacent pixels, the photodetector device comprising a CCD image pick-up device which covers the illuminated sub-surface area and which is arranged and controlled so that charges generated by the fluorescent light in the cells of the CCD image pick-up device are transported in the same direction and at the same speed as the sub-surface area illuminated by the light source is displaced, said imaging device including means for causing said pick-up imaging device and said light source to simultaneously read and illuminate the respective adjacent pixels of the sub-surface area.

2. A device as claimed in claim 1, characterized in that the photodetector device comprises an image intensifier which is arranged between the record carrier and the CCD image pick-up device and which images the fluorescent light produced from the storage phosphor record carrier onto the CCD image pick-up device.

3. A device as claimed in claim 1 characterized in that the CCD image pick-up device comprises a plurality of CCD image pick-up elements which are adjacently arranged, perpendicularly to the displacement direction.

4. A device as claimed in claim 1 characterized in that a gas discharge lamp is used for the light source.

5. A device as claimed in claim 4, characterized in that the gas discharge lamp is a sodium low-pressure lamp.

6. A device as claimed in claim 1, characterized in that a clock frequency for the image pick-up device and a clock frequency for the drive device are synchronized.

7. A device as claimed in claim 1, characterized in that between the record carrier and the photodetector device there is arranged a filter which absorbs the light of the light source and which transmits the fluorescent light.

8. The device of claim 1 wherein said CCD device comprises a plurality of pick-up elements arranged in a first two dimensional array, said elements being secured to corresponding fiber optical segments in a second two dimensional array, said segments forming channels aligned with the direction of transport of said carrier in one direction of the array, said means for causing including means responsive to clock pulses including register means for receiving the charges from the segments corresponding to each of said channel and means for securing said clock pulses, and, in response to said clock pulses applied to said register means, for transferring therefrom the received charges at the same speed and in same direction as the pixel-to-pixel displacement of the image on the storage phosphor record carrier.

9. The device of claim 8 wherein said transport means includes at least one roller having a given angular velocity for displacing said carrier, said means for generating clock pulses including pulse generating means coupled to said at least one roller for generating pulses corresponding to said angular velocity and circuit means for deriving from said latter pulses a first clock pulse for clocking said charges into said register means and a second clock pulse for stage-to-stage transferring of the charges in said register means at said same speed.

* * * * *